United States Patent [19]
Söderberg

[11] Patent Number: 5,870,883
[45] Date of Patent: Feb. 16, 1999

[54] METHOD AND A DEVICE FOR WRAPPING WITH WEB-SHAPED MATERIAL

[76] Inventor: Staffan Söderberg, Hälleby Gård, S-150 16 Hölö, Sweden

[21] Appl. No.: 875,700
[22] PCT Filed: Jan. 18, 1996
[86] PCT No.: PCT/SE96/00045
§ 371 Date: Jul. 11, 1997
§ 102(e) Date: Jul. 11, 1997
[87] PCT Pub. No.: WO96/22225
PCT Pub. Date: Jul. 25, 1996
[51] Int. Cl.[6] ..................................................... B65B 13/02
[52] U.S. Cl. ................................................ 53/399; 53/587
[58] Field of Search ............................... 53/399, 587, 502

[56] References Cited

U.S. PATENT DOCUMENTS

| | | | |
|---|---|---|---|
| 5,042,225 | 8/1991 | Drury et al. | 53/587 |
| 5,046,296 | 9/1991 | Drury et al. | 53/587 |
| 5,327,706 | 7/1994 | Skole | 53/587 |
| 5,385,001 | 1/1995 | Ramer | 53/587 |
| 5,483,785 | 1/1996 | DiCarlo | 53/587 |
| 5,487,255 | 1/1996 | Söderberg | 53/399 |
| 5,505,038 | 4/1996 | Karlqvist | 53/587 |
| 5,715,655 | 2/1998 | Söderberg | 53/587 |
| 5,727,359 | 3/1998 | Rampp | 53/587 |

FOREIGN PATENT DOCUMENTS

| | | |
|---|---|---|
| 0543792 | 5/1993 | European Pat. Off. . |
| 4425428 | 1/1995 | Germany . |
| 500211 | 5/1994 | Sweden . |
| 9113540 | 9/1991 | WIPO . |

*Primary Examiner*—Daniel B. Moon
*Assistant Examiner*—John Paradiso
*Attorney, Agent, or Firm*—Pearne, Gordon, McCoy & Granger LLP

[57] ABSTRACT

A method for packing bodies (3), e.g. fodder bales of a generally cyclindrical or parallelpipedic configuration, in continuous material, such as plastics, comprising a support of the body and a winding of continuous material around the body from at least one magazine with continuous material while rotating the body around a first axis (7) of the body by means of a roller arrangement including at least one roller device (5'), downwards to which the body envelope surface (9) then rotates, is adapted to approach the body envelope surface. The invention also relates to a device for packing bodies.

18 Claims, 2 Drawing Sheets

METHOD AND A DEVICE FOR WRAPPING WITH WEB-SHAPED MATERIAL

BACKGROUND OF THE INVENTION

The present invention relates to a method for packing bodies, e.g. fodder bales with an essentially cylindrical or parallelepipedic configuration, in a continous material, such as continous plastics, comprising to support the body and winding the continous material around the body from one or several magazines for continous material while rotating the body around a first axis of the body by means of a roller arrangement, comprising at least one rotatably arranged roller device.

The invention relates also to a device for performing the method.

Methods of essentially the above mentioned type are already known. According to such a known method a body, such as a bale, is supported on a table with two axially parallel and at a distance from each other arranged rolls, between which continous belts or stripes are running. The bands are arranged to rotate the bale around said first axis being essentially parallel to the roller axes. An essential problem with bales with a square or a rectangular cross section across said first axis exists, in that the bale circumferential speed is varying during each turn. From a position with the bale resting on a corner, the bale thus tilts, parts of the bale perpihery then having a speed surpassing that for a normal driven rotation. This results in a varying overlapping of the continous material, the plastics, wrinkling at the bale end portions as well as highly undesired thrust stresses in the structure, when the bale hits the roll lying in the tilting direction. Bale rotation will also become more energy consuming than necessary, when the bale must be lifted to a greater extent, when the corner/edge hits the belt. The bales might have a weight over 500 kg/m$^3$, the tendency being to even larger bale weights.

SUMMARY OF THE INVENTION

The present invention relates to a solution of the above described problems.

In accordance with the present invention, a method is provided for packing bodies in continuous material. Pursuant to the method, a roller arrangement is provided. The roller arrangement has a pair of spaced-apart roller devices with a belt drive running therebetween. At least one magazine is provided for holding the continuous material. The body is supported with the belt drive of the roller arrangement. The continuous material is wound around the body from the at least one magazine while the body is rotated around a first axis of the body using the roller arrangement. The at least one roller device is raised and lowered during the rotation of the body so as to approach an envelope surface of the body.

Also provided in accordance with the present invention is a device for packing a body in continuous material. The device includes a magazine for holding the continuous material. A roller arrangement is provided for rotating the body around a first axis so as to wind the continuous material from the magazine around the body. The roller arrangement includes a pair of spaced-apart roller devices with a belt drive running therebetween. The belt drive is adapted to support the body. At least one roller device (5') is raisable and lowerable to permit the at least one roller device to approach an envelope surface (9) of the body during a downward rotation of the envelope surface.

The invention will be described more in detail in connection with execution examples and the attached drawings, in which

BREIF DESCRIPTION OF THE DRAWINGS

FIG. 1 schematically shows a view of a first embodiment of a device for winding continuous material around a body, such as a fodder bale, FIG. 2 schematically shows a first embodiment of a device according to the invention seen in the direction of a first body axis and likewise of the rotation axis of roller devices arranged to cooperate when rotating and supporting the bodies, FIG. 3 schematically shows the device of FIG. 2 with the body and a roller device in a position different from FIG. 2, FIG. 4 schematically shows another embodiment of a device according to the invention seen as the device according to FIGS. 2 and 3, FIG. 5 schematically shows a third embodiment, essentially corresponding to the one shown in FIG. 4, and FIG. 6 schematically shows a hydraulic arrangement for damping, etc.

DETAILED DESCRIPTION OF THE PREFERRED EMBODIMENTS

Figure 1:
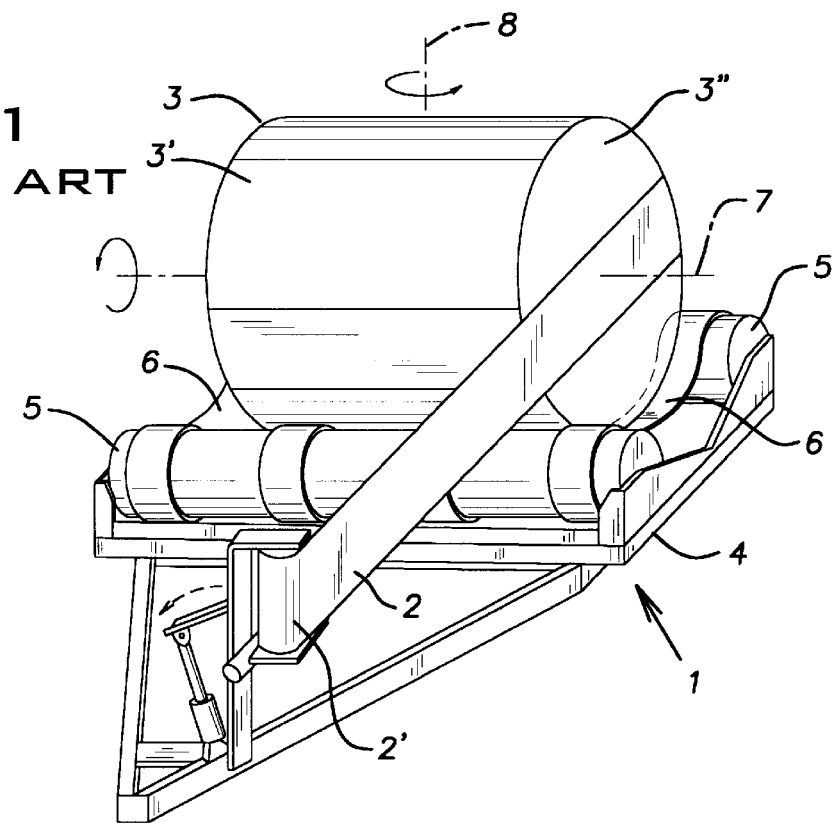

FIG. 1 a known device is designated with 1 for winding continuous material 2 around a body 3, such as a fodder bale, for packing. The embodiments of such devices are described e.g. in the Swedish Patent 9101032-2. With 4 is designated a support for a body, comprising two roller devices 5, rolls 5, between which at least one continuous belt drive 6 is running for cooperation during a support of the body and for rotating the body around a first axis 7 of the body. According to the embodiment shown here, the body is also rotatable around a second axis 8 of the body, this axis 8 being generally perpendicular to said first axis. The problems the invention aims to solve are related to the rotation of the body, the bale, around said first axis. As to the method of winding and packing itself, there are several variations, to which the invention can be applied. During winding according to FIG. 1 successive turns are wound around both the long sides 3' of the body and its end portions 3", rotating the body around said first axis and said second axis, at least one magazine 2' for continuous material being provided stationary. According to another embodiment (not shown) the rotation of the body is performed around said first axis, while the magazine(s) is caused to rotate around the body by means of a bracket supporting the magazine(s) or similar. According to said swedish patent the windings described therein are preferably supplemented by a crossing winding (not shown), the continuous material being arranged to contact the body across said first axis, thereby crossing the body long sides.

Figure 2:
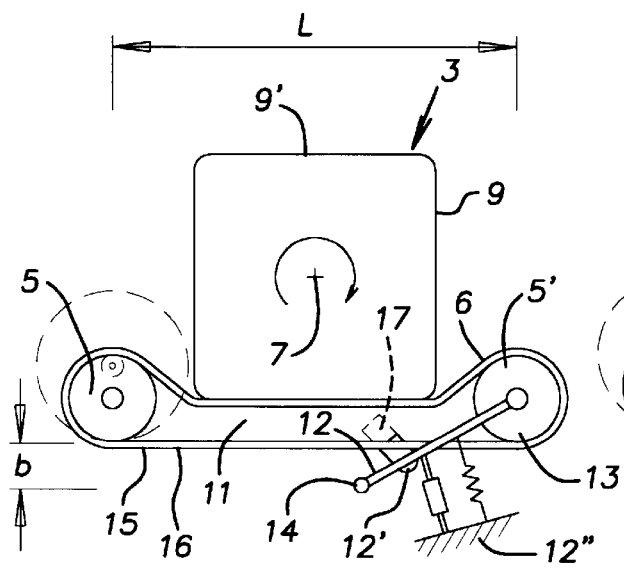
Figure 3:
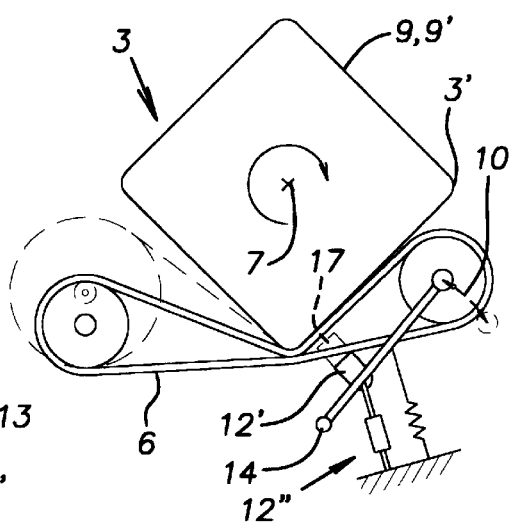

Referring now to FIGS. 2 and 3, according to the present invention a roller device 5' is arranged risingly and fallingly, i.e. the one, in the direction towards which the body circumference or upper side 9' of the envelope surface 9 is arranged to move during the rotation of the body, and down towards which the body circumference is moved, as indicated by an arrow 10 in FIG. 3, to meet the body circumference during rotation to comply with the variations in the body circumference configurations and to prevent or counteract any variations in the speed of the body envelope surface 9 and the body rotary speed. Then, the rising and falling roller device 5' is generally following the body circumference and prevents a body with a square, rectangular or similar cross section to tip from a position resting on a corner, see FIG. 3. Otherwise an uneven overlapping is achieved of the continuous material as well as shocks against the roller device.

According to the first embodiment shown in FIG. 2 and 3 the roller device or the roll 5' is displaced in relation to the circumference of the body upper side, thereby pushing the lower circumference of the bale in towards a device portion 11 between the two relatively generally parallel roller devices 5, 5' pivotingly supported by means of link devices 12 for achieving a rising and falling. Thus, the roller device 5' is preferably suspended at each and portion 13 by means of a link device extending from a swivelling center 14, preferably arranged substantially below a track 15, in which runs the lower portion 16 of said belt drive(s). According to a preferred embodiment the link devices, here shown as simple brackets or bars, are besides by the roller device connected by means of a boom device 12' running between the link devices, the boom then generally stretching parallelly to the roller devices. The boom device is also arranged to support a rider 17 for controlling one or several belt drives, see FIG. 2. In many cases it is also preferred that said pivoting center is situated assymmetrically in relation to the roller devices and thus closer to the rising and falling roller device 5', e.g. in such a way that the distance between the pivoting center and the center of the rising and falling roller device 5' is about 40 percent of the total distance L between the roller devices 5, 5'. In the vertical direction the distance between the pivoting center and the lower belt drive is preferably about 120 mm, the belt drive then running generally horizontally, see FIG. 2, altogether with a bale side length of 800 to 1000 mm in the view shown in FIG. 2. The purpose of this arrangement is that the tension in the drive(s) by the bale weight is lifting the roll 5', the drive(s) then slackening and possibly swallowing the bale comer without lifting the bale, thus saving energy. This effect is increased by placing the stationary roller device or the roll 5 higher or providing it with a larger diameter corresponding approximately a larger swallowing height with the body dimension. Such an arrangement can be adjusted so that the bale center axis 7 is not moving up and down during any bale rotation. Such an arrangement with a larger diameter of the stationary roller device is schematically shown and drawn with dashed lines in FIGS. 2 and 3.

With 12" are designated devices cooperating with said link devices, such as resilient and damping piston and/or spring devices, for a damping, essentially for absorbing shocks from the body against the approaching roller device 5'. In this way a combination of a hydraulic shock absorber and a pressure spring can be used.

Figure 4:
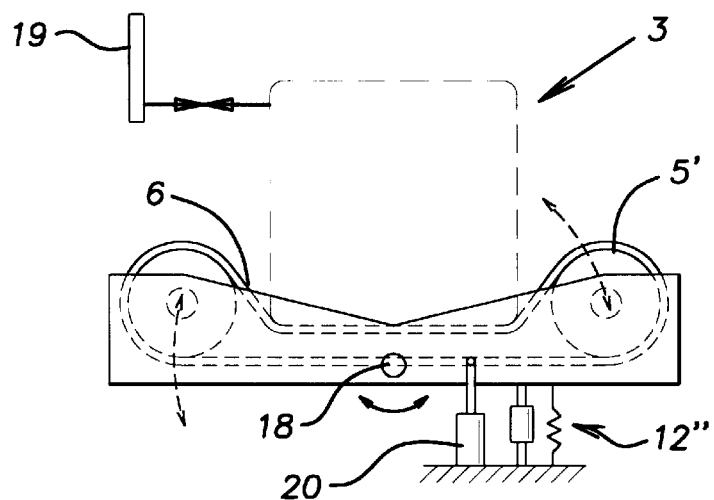

According to the second embodiment shown in FIG. 4 said support and the roller devices 5, 5' connected to the support are together pivotably and tiltably arranged preferably around a pivoting center 18 arranged between the roller devices for said adaptation by means of rising and lowering, as indictacd in FIG. 4. According to at least this embodiment there are devices 19 of a convenient known type for detecting the position of the body circumference, e.g. in relation to said risingly and fallingly approaching roller device 5' as well as devices (not shown) for controlling said pivoting or for controlling a corresponding tilting of said rising and falling in relation to the position of the body circumference for said adaptation devices 20, such as one or several hydraulic cylinders 20, being provided to achieve a pivoting or tilting according to said control. Even here suitable resilient devices 12' are provided for a damping, as indicated in FIG. 4. The devices sensing the body position can e.g. be mechanical devices (not shown), such as a bracket or similar, being by means of a switch or similar arranged to detect e.g. the vertical position of the upper belt drive, in relation to the body position, as might be seen by comparing FIGS. 2 and 3.

Figure 5:
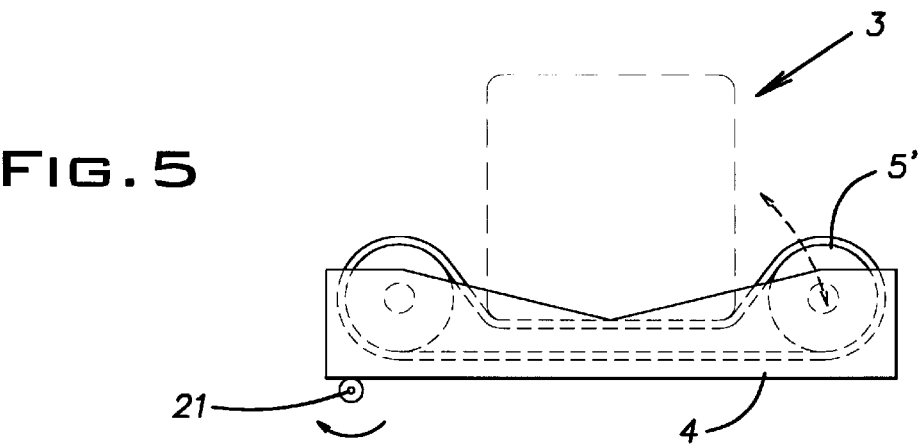

In case the support is tiltable itself to tilt already packaged bodies it might be considered to combine this feature with said pivoting around the same pivoting center 21, see FIG. 5, the pivoting center 18 possibly lying outside of the portion 11 between the roller devices. The devices 20 for achieving said adaptation are here conveniently also used as tilting devices.

Figure 6:
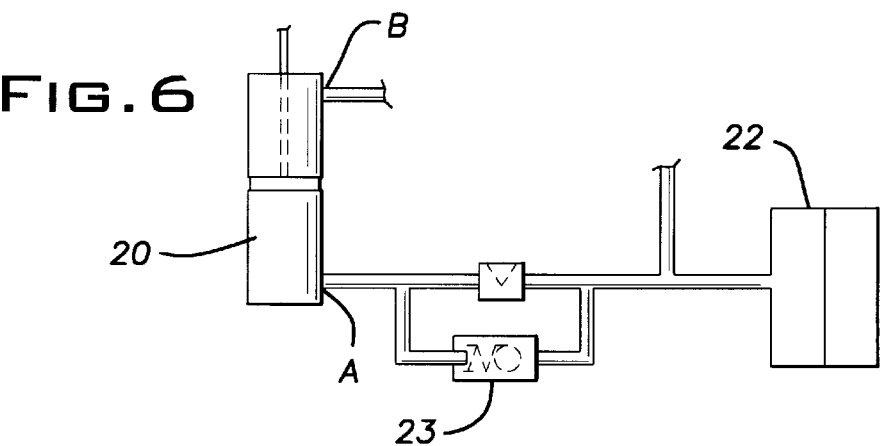

In embodiments with hydraulic devices 20 for said approach these might be combined with any damping arrangements, e.g. in accordance with FIG. 6. According to one embodiment the hydraulic piston 20 is then on its operative side, port A, connected to an oil gas accumulator 22 by means of a throttling valve 23, the damping then being performed towards the oil gas accumulator. The return side of the piston 20, port B is also adapted to be pressurized for a return, the rising and falling roller device 5' then being returned to a lower, properly defined position.

According to a preferred embodiment comprising devices for packing items (not shown), generally according to the Swedish Patent 9301086-6 to keep the continuous material ap- proaching the body envelope surface during cutting of the continuous material for a final winding, the winding thus being terminated with a turn of the crossing kind running across said first axis. These devices are preferably arranged to be activated by means of at least one hydraulic cylinder for operating brackets or similar, the hydraulic system then being arranged so that hydraulic devices 20 are synchronically activated, when devices for supporting the continuous material are activated, arranged for said rising and falling for said adaptation to lower to achieve properly defined conditions, regarding the position in combination with a gripping, etc. of the continuous material . The lowering is conveniently performed via said return side, port B.

The method as well as the operation of said device according to the invention is substantially evident from what is stated above.

According to the basic principle, therefore, a roller device or roll is arranged, so that it approaches the envelope surface of the body, the bale, on its way downwards during a rotation of the body to prevent variations in speed and to minimize any shocks in the structure. Especially, a body standing on its corner is prevented to tip freely, when it is tilted over from an unstable position, when resting on its corner.

In the embodiment according to FIGS. 2 and 3 and similar embodiments with the body supported and rotated by means of one or several belt drives, a generally self adjusting system is achieved and the roller devices are pivotably supported in a suitable shown way. The body weight is creating tensile stresses in a belt drive between the roller devices, said tensile stresses tending to rise the roller device 5', conveniently pivotably and suitably arranged. In the transition from the position shown in FIG. 2, where the roller device 5' is loaded by the body, to the position shown in FIG. 3, a component of the tensile force due to the position of the pivoting center to successively rise the roller device 5' will thereby approach the comer 3' of the body on its way downwards, thereby preventing the body to uncontrollably tilt from its position, when standing on one corner. The operation of the embodiment according to FIGS. 3 and 4 is subtsantially the same, however, no self control is achieved, but any rising or falling is controlled in relation to the detected body position.

As will also be evident from what is stated previously, the invention provides essential advantages compared with what is known in the art. Thus, an essential reduction is achieved in service and repair due to lower stresses in the device.

Moreover, a more even distribution of the packing material is achieved resulting in better quality.

Moreover, the productivity is increased, as the winding speed can be augmented, especially when winding across said first axis, i.d in applying a cross winding according to above mentioned Swedish Patent. The stresses due to shocks etc. are generally restricting the maximum allowed rotary speed of the body.

The invention has been described above in connection with several execution examples. Of course, further embodiments and minor changes and amplifications might be made without departing from the scope of the invention.

Embodiments generally according to FIGS. 2 and 3 can of course be provided with the body position being detected and said rising and falling being controlled in relation to said position as with the embodiments according to FIGS. 3 and 4.

Embodiments might also be provided with the body not being supported by means of belt drives, but e.g. by means of several rolls arranged along a cylinder or in some other configuration. Also for devices with belt drives roller devices might be provided, such as planetary type devices.

I claim:

1. A method for packing a parallelepipedic body in continuous material, said method comprising the steps of:
   providing a roller arrangement having a pair of spaced-apart roller devices with a belt drive running therebetween;
   providing at least one magazine for holding the continuous material;
   supporting the body with the belt drive of the roller arrangement;
   winding the continuous material around the body from the at least one magazine while rotating the body around a first axis of the body using the roller arrangement; and
   raising and lowering at least one roller device to permit the at least one roller device to approach an envelope surface of the body during a downward rotation of the envelope surface.

2. A method according to claim 1, wherein the at least one roller device (5) is adapted to pivot around a pivoting center (14) arranged substantially under (15), a lower portion (16) of said belt drive.

3. A method according to claim 1, wherein the at least one roller device (5') is adapted to pivot around an assymmetrically arranged pivoting center (14), said pivoting center being positioned at less than half the distance (L) between the roller devices (5) from said at least one roller device (5').

4. A method according to claim 1, wherein the roller arrangement further includes a support to which the roller devices are connected, and wherein said support (4) and the roller devices connected to the support are together pivotably arranged around a pivoting center and are adapted to pivot to permit the at least one roller device to be raised and lowered.

5. A method according to claim 1, further comprising the step of detecting the orientation of the body; and
   wherein the raising and lowering of the at least one roller device is performed in response to the orientation of the body.

6. A method according to claim 1, further comprising the steps of:
   providing a resilient device; and
   dampening said raising and lowering of the at least one roller device using the resilient device to compensate for shocks from the body.

7. A method according to claim 6, wherein said resilient device comprises at least one hydraulic piston (20).

8. A method according to claim 1, further comprising the steps of:
   gripping and supporting the continuous material in a position across said first axis against the approaching body; and
   winding and cutting the continuous material;
   wherein said step of gripping and supporting is synchronized with said step of raising and lowering so that said at least one roller device is lowered to a lower position for the gripping and supporting step.

9. A device for packing a body in continuous material, said device comprising:
   a magazine for holding the continuous material;
   a roller arrangement for rotating the body around a first axis so as to wind the continuous material from the magazine around the body, said roller arrangement including a pair of spaced-apart roller devices with a belt drive running therebetween, said belt drive being adapted to support the body;
   wherein at least one roller device (5') is raisable and lowerable to permit the at least one roller device to approach an envelope surface (9) of the body during a downward rotation of the envelope surface.

10. A device according to claim 9 further comprising means for using the weight of said body to achieve a raising and lowering of the at least one roller device (5').

11. A device according to claim 13, further comprising a link device (12) connected to the at least one roller device such that the at least one roller device (51) is pivotable around a pivoting center (14), situated substantially below a lower portion (16) of said belt drive.

12. A device according to claim 9 wherein the at least one roller device (51) is adapted to pivot around an assymmetrically arranged pivoting center (14), said pivoting center lying at less than half the distance (L) between the roller devices (5) from the at least one roller device (51).

13. A device according to claim 11, further comprising another link device, and wherein end portions of the at least one roller device are rotatably supported by the link devices, said link devices extending from said connected together by a boom device (12').

14. A device according to claim 9, wherein the rolller arrangement further includes a support to which the roller devices are connected, and wherein said support (4) and said roller devices (5) are together pivotably arranged for raising and lowering to approach the envelope surface of the body.

15. A device according to claim 9, further comprising:
   devices (19) for scanning a position of the body (3) envelope surface (9) relative to said at least one roller device;
   devices for adjusting said raising and lowering in relation to the position of the body envelope surface for said approach: and
   devices (20) for raising and lowering said at least one roller device.

16. A device according to claim 15, further comprising a resilient device for dampening the raising and lowering of the at least one roller device to compensate for shocks from the body; and
   wherein the devices for raising and lowering also provide dampening for compensating for shocks from the body against the at least one roller device (51).

17. A device according to claim 16, wherein the devices for raising and lowering comprise hydraulic pistons.

18. A device according to claim 15, further comprising devices for gripping and supporting said continuous material in a position running across said first axis towards the body for final winding and cutting of said continuous material; and devices for synchronizing the devices for gripping and supporting with the devices (20) for raising and lowering, so that said at least one roller device is lowered to a lower position by said raising and lowering devices (20) for said gripping and supporting step.

\* \* \* \* \*

UNITED STATES PATENT AND TRADEMARK OFFICE
CERTIFICATE OF CORRECTION

PATENT NO. : 5,870,883
DATED : February 16, 1999
INVENTOR(S) : Soderberg

It is certified that error appears in the above-indentified patent and that said Letters Patent is hereby corrected as shown below:

On the Title Page, add --[30] Foreign Application Priority Data, Jan. 18, 1995 Sweden 9500157-4--.

Column 3, Line 30, delete "comer" and insert --corner--.

Column 3, Line 51, delete "indictacd" and insert --indicated--.

Column 4, Line 21, delete "ap- proaching" and insert --approaching--.

Column 5, Line 43, Claim 2, delete "(15)".

Column 6, Line 31, Claim 11, delete "claim 13" and insert --claim 9--.

Column 6, Line 44, Claim 13, after "said" (second occurrence), insert --pivoting center (14) and being--.

Signed and Sealed this

Twenty-seventh Day of July, 1999

Attest:

Q. TODD DICKINSON

*Attesting Officer*   *Acting Commissioner of Patents and Trademarks*